US011458435B2

(12) United States Patent
Mashiko et al.

(10) Patent No.: US 11,458,435 B2
(45) Date of Patent: Oct. 4, 2022

(54) ACIDIC GAS SEPARATION DEVICE AND ACIDIC GAS SEPARATION METHOD

(71) Applicant: Japan Oil, Gas and Metals National Corporation, Tokyo (JP)

(72) Inventors: Yoshinori Mashiko, Kashiwa (JP); Minoru Morita, Kashiwa (JP); Takeo Kawase, Tokyo (JP); Yosuke Kunishi, Tokyo (JP)

(73) Assignee: Japan Oil, Gas and Metals National Corporation, Tokyo (JP)

( * ) Notice: Subject to any disclaimer, the term of this patent is extended or adjusted under 35 U.S.C. 154(b) by 0 days.

(21) Appl. No.: 17/251,134

(22) PCT Filed: Jun. 18, 2018

(86) PCT No.: PCT/JP2018/023136
§ 371 (c)(1),
(2) Date: Dec. 10, 2020

(87) PCT Pub. No.: WO2019/244211
PCT Pub. Date: Dec. 26, 2019

(65) Prior Publication Data
US 2021/0129074 A1 May 6, 2021

(51) Int. Cl.
*B01D 53/22* (2006.01)
*B01D 63/02* (2006.01)
(Continued)

(52) U.S. Cl.
CPC ......... *B01D 53/226* (2013.01); *B01D 53/228* (2013.01); *B01D 63/02* (2013.01);
(Continued)

(58) Field of Classification Search
CPC .. B01D 63/10; B01D 2053/224; B01D 63/02; B01D 53/226; B01D 2317/025;
(Continued)

(56) References Cited

U.S. PATENT DOCUMENTS

| 6,221,131 | B1 | 4/2001 | Behling et al. |
| 2014/0144321 | A1 | 5/2014 | Swamura et al. |
| 2018/0272272 | A1* | 9/2018 | Hasegawa ............ B01D 53/226 |

FOREIGN PATENT DOCUMENTS

| CA | 2999003 A1 | 4/2017 | |
| JP | 09124514 A * | 5/1997 | ........... B01D 53/226 |

(Continued)

OTHER PUBLICATIONS

First Office Action for Japanese Patent Application No. 2020-525093 dated Mar. 26, 2021 with English language ranslation provided by Shiga International Patent Office, 6 pages. (Year: 2021).*

(Continued)

*Primary Examiner* — Anthony R Shumate
(74) *Attorney, Agent, or Firm* — Honigman LLP

(57) ABSTRACT

An acidic gas separation device includes: a first separation device which has an inorganic separation membrane and is configured to separate a gaseous hydrocarbon fluid containing an acidic gas into a first gaseous fluid having a large acidic gas content and a second gaseous fluid having a smaller acidic gas content than the first gaseous fluid by the inorganic separation membrane; and a second separation device which has an organic polymer separation membrane and is configured to separate the second gaseous fluid into a third gaseous fluid having a large acidic gas content and a fourth gaseous fluid having a smaller acidic gas content than the third gaseous fluid by the organic polymer separation membrane.

12 Claims, 3 Drawing Sheets

(51) Int. Cl.
    *B01D 63/10*     (2006.01)
    *B01D 71/02*     (2006.01)
    *B01D 71/06*     (2006.01)
    *C10L 3/10*     (2006.01)

(52) U.S. Cl.
    CPC ............ *B01D 63/10* (2013.01); *B01D 71/02* (2013.01); *B01D 71/06* (2013.01); *C10L 3/102* (2013.01); *B01D 2053/224* (2013.01); *B01D 2313/24* (2013.01); *B01D 2317/025* (2013.01); *C10L 2290/548* (2013.01)

(58) Field of Classification Search
    CPC .. B01D 2313/24; B01D 53/228; B01D 71/06; B01D 71/02; C10L 2290/548; C10L 3/102
    See application file for complete search history.

(56) References Cited

FOREIGN PATENT DOCUMENTS

| | | |
|---|---|---|
| JP | 2012-236134 A | 12/2012 |
| JP | 2015-017185 A | 1/2015 |
| JP | 2016155987 A | 9/2016 |
| JP | 2017-080698 A | 5/2017 |
| WO | 2017/056135 A1 | 4/2017 |

OTHER PUBLICATIONS

International Search Report for PCT/JP2018/023136 dated Aug. 14, 2018.

* cited by examiner

ACIDIC GAS SEPARATION DEVICE AND ACIDIC GAS SEPARATION METHOD

TECHNICAL FIELD

The present invention relates to an acidic gas separation device and an acidic gas separation method for separating an acidic gas from a gaseous production fluid such as an oil field associated gas mined with crude oil in an oil field and a natural gas mined in a gas field.

BACKGROUND ART

A so-called oil field associated gas mined with crude oil in an oil field or a gas produced from a gas field is a mixed fluid containing a so-called acidic gas such as carbon dioxide and hydrogen sulfide, water, metals such as iron and mercury, and compounds thereof in addition to a plurality of hydrocarbons having different boiling points.

A mixed fluid such as an oil field associated gas or a gas produced from a gas field is shipped as a natural gas after an acidic gas or water contained in the mixed fluid is removed so that its concentration becomes a predetermined value or less and gaseous hydrocarbons containing methane as a main component are obtained.

Conventionally, a method of absorbing and removing an acidic gas with an amine compound has been widely adopted, but in recent years, organic polymer separation membranes that have different permeability (selective permeability) between methane and carbon dioxide have been proposed. For example, Patent Document 1 discloses an organic polymer-based carbon dioxide separation membrane coated on a ceramic porous body (Paragraph 0089). Further, Patent Document 2 discloses a technique of separating carbon dioxide from a methane gas obtained by methane fermentation by combining two stages of separation membrane modules using polyimide hollow fibers.

The organic polymer-based separation membrane can be molded into a hollow fiber or a thin membrane by, for example, extrusion molding, and the separation performance per weight and volume is very high when viewed as the separation membrane module. Further, since the organic polymer separation membrane generally has a higher gas permeability of carbon dioxide and hydrogen sulfide than the gas permeability of methane, a plurality of modules are connected in series in the facility to obtain a high acidic gas separation ratio.

Since an exhaust gas from which methane is separated to increase the acidic gas content ratio, that is, an acidic gas rich exhaust gas, contains a considerable amount of hydrocarbons such as methane, the exhaust gas is flared or injected into a stratum.

The removal of the acidic gas by such an organic polymer separation membrane has been attracting attention because of good energy efficiency, a small installation area of facility, and an easy operation.

CITATION LIST

Patent Documents

Patent Document 1: Japanese Unexamined Patent Application, First Publication No. 2015-017185
Patent Document 2: Japanese Unexamined Patent Application, First Publication No. H09-124514

SUMMARY OF INVENTION

Technical Problem

However, the inventors have found that the deterioration of performance of the organic polymer separation membrane is accelerated when the carbon dioxide concentration in the gas to be treated exceeds 20% and the profitability is not easily secured when the carbon dioxide concentration in the gas produced in the gas field exceeds 30%.

On the other hand, the carbon dioxide concentration of the gas produced in the newly developed gas field continues to increase with the progress of resource development in recent years. The inventors expect that the carbon dioxide concentration will also increase in the oil field associated gas due to the secondary recovery of carbon dioxide by injection into the stratum or the like.

The present invention has been made in view of the above-described circumstances and an object of the present invention is to provide an acidic gas separation device and an acidic gas separation method of separating an acidic gas from a gaseous hydrocarbon fluid containing a high concentration of carbon dioxide with high separation efficiency and excellent profitability.

Solution to Problem

An acidic gas separation device according to the present invention includes: a first separation device which has an inorganic separation membrane and is configured to separate a gaseous hydrocarbon fluid containing an acidic gas into a first gaseous fluid having a large acidic gas content and a second gaseous fluid having a smaller acidic gas content than the first gaseous fluid by the inorganic separation membrane; and a second separation device which has an organic polymer separation membrane and is configured to separate the second gaseous fluid into a third gaseous fluid having a large acidic gas content and a fourth gaseous fluid having a smaller acidic gas content than the third gaseous fluid by the organic polymer separation membrane.

In the acidic gas separation device according to the present invention, the inorganic separation membrane may be a ceramic separation membrane.

The acidic gas separation device according to the present invention may further include a pressurizing device which is configured to pressurize the third gaseous fluid.

In the acidic gas separation device according to the present invention, the first separation device may include a first high-boiling-point component separation device which is configured to remove a high-boiling-point component from the gaseous hydrocarbon fluid.

In the acidic gas separation device according to the present invention, the second separation device may include a second high-boiling-point component separation device which is configured to remove a high-boiling-point component from the second gaseous fluid.

An acidic gas separation method according to the present invention includes: a first separation step of separating a gaseous hydrocarbon fluid containing an acidic gas into a first gaseous fluid having a large acidic gas content and a second gaseous fluid having a smaller acidic gas content than the first gaseous fluid by an inorganic separation membrane; and a second separation step of separating the second gaseous fluid into a third gaseous fluid having a large acidic gas content and a fourth gaseous fluid having a smaller acidic gas content than the third gaseous fluid by an organic polymer separation membrane.

Advantageous Effects of Invention

According to the present invention, a gaseous hydrocarbon fluid containing an acidic gas is separated into two stages from a gaseous hydrocarbon fluid and in a separation process at a front stage, the acidic gas concentration of the gaseous hydrocarbon fluid is reduced to the extent that deterioration of performance of an organic polymer separation membrane is less likely to progress. Then, in a separation process at a rear stage, the acidic gas concentration of the gaseous hydrocarbon fluid is reduced by using the organic polymer separation membrane. Accordingly, it is possible to reduce the frequency of replacement by suppressing the deterioration of performance of the organic polymer separation membrane which is not easily regenerated.

That is, since the organic polymer separation membrane having the advantages of energy efficiency, a compact size not requiring a large installation area, and an easy operation can be used for a long period of time without frequent replacement, the initial cost for installing the acidic gas separation device is suppressed to be low. At the same time, since the operation rate of the facility is improved, the depreciation burden of the facility can be reduced. Further, since the replacement frequency of the consumable separation membrane decreases, the operating cost of the facility can be reduced. Accordingly, it is possible to improve the profitability in commercializing gaseous hydrocarbon fluids derived from oil fields (or gas fields) that have high concentrations of acidic gases such as carbon dioxide and hydrogen sulfide and low concentrations of available hydrocarbon components.

DESCRIPTION OF EMBODIMENTS

First Embodiment

In the present embodiment, an oil field associated gas is separated from a production fluid produced from an oil well corresponding to a production well, and an acidic gas is separated from the separated oil field associated gas. Further, a hydrocarbon gas from which the acidic gas is separated and which contains methane as a main component is shipped as a raw material of a natural gas and a petroleum gas, and an acidic gas rich exhaust gas separated from the oil field associated gas is re-injected underground through an injection well.

Figure 1:
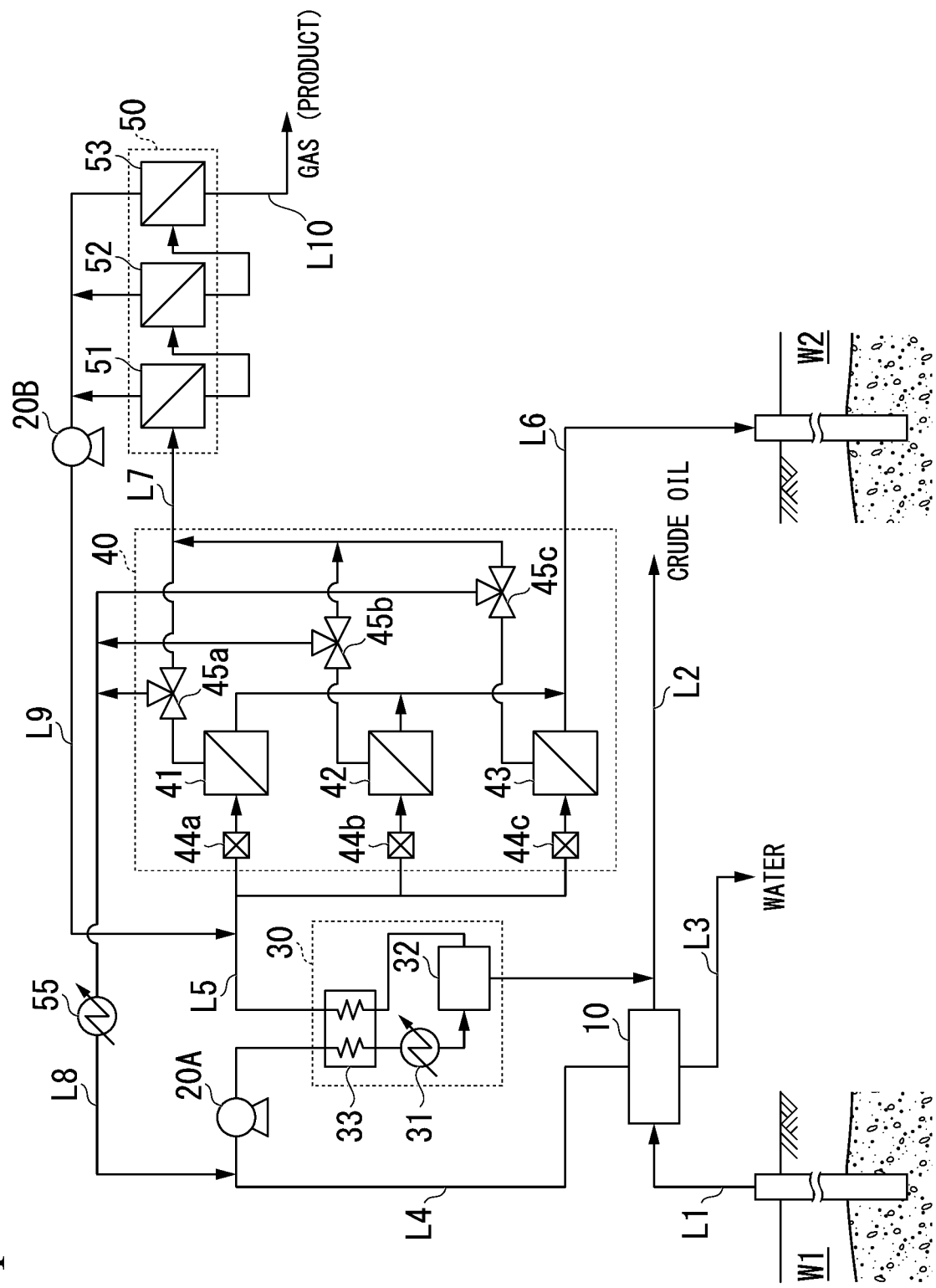
FIG. 1 is a block diagram showing a configuration of a first embodiment of an acidic gas separation device of the present invention.

As shown in FIG. 1, an acidic gas separation device according to the present embodiment includes a separator 10, compressors (pressurizing devices) 20A and 20B, a condenser (first high-boiling-point component separation device) 30, a separation device (first separation device) 40, and a separation device (second separation device) 50.

A production well W1 of the present embodiment is an oil well. The production fluid self-injected or pumped up from the production well W1 is a mixture of various compositions of hydrocarbon components, water, so-called acidic gases such as carbon dioxide and hydrogen sulfide, inert gases such as nitrogen and helium, and metal salts and compounds such as iron, mercury, and sodium having various boiling points under normal pressure environment. The production fluid pumped up from the production well W1 is separated into a gas phase component, an oil phase component, and a water phase component by the separator 10. Among these, the oil phase component is carried as crude oil through a pipeline to a shipping base and is shipped as crude oil. The water phase component is injected underground or injected into the environment after being purified as oil-field associated water produced in the field. The gas phase component contains a so-called acidic gas such as carbon dioxide and hydrogen sulfide, water vapor, and the like in addition to methane and ethane which are main components of a natural gas as a product, propane and butane which are main components of a liquefied petroleum gas (LPG), a small amount of pentane, and heavy hydrocarbon having a molecular weight equal to or larger than pentane. Hydrocarbons having a molecular weight equal to or larger than pentane in the gas phase component are main components of condensate oil.

The compressor 20A pressurizes a gas phase component from which an oil phase component and a water phase component are separated by the separator 10. Hereinafter, the gas phase component pressurized by the compressor 20A is referred to as a gaseous hydrocarbon fluid.

The condenser 30 includes a cooler 31, a gas-liquid separation device 32, and a heat exchanger 33. The cooler 31 cools the gas phase component pressurized by the compressor 20A, that is, the gaseous hydrocarbon fluid, so that the water vapor contained in the gaseous hydrocarbon fluid and a part of the heavy hydrocarbon having a molecular weight equal to or larger than pentane are condensed. The condensate obtained in the cooler 31 is so-called condensate oil, is separated from the gaseous hydrocarbon fluid by the gas-liquid separation device 32, and is carried to the shipping base through a pipeline along with the crude oil separated from the water and the gas phase component in the separator 10. The heat exchanger 33 cools the gaseous hydrocarbon fluid to be introduced into the cooler 31 by exchanging heat between the gaseous hydrocarbon fluid to be introduced into the cooler 31 in the condenser 30 and the gaseous hydrocarbon fluid from which the condensate oil is separated in the gas-liquid separation device 32. Additionally, in the present embodiment, the condensate is mixed with the crude oil, but may be shipped alone as the condensate oil after water is removed therefrom.

The separation device 40 includes separation membrane modules 41, 42, and 43 having inorganic separation membranes. Each of the separation membrane modules 41, 42, and 43 separates the gaseous hydrocarbon fluid separated from water vapor and heavy hydrocarbon having a molecular weight equal to or larger than pentane into a first gaseous fluid having a high acidic gas content and a second gaseous fluid having a smaller acidic gas content than the first gaseous fluid by the inorganic separation membrane.

In the separation device 40, since a considerable amount of the acidic gas component is removed from the gaseous hydrocarbon fluid, the partial pressure of the condensate oil component that has not been separated in the condenser 30 increases and the condensate oil component is condensed in the separation membrane modules 41, 42, and 43. Here, the separation device 40 further includes heaters 44a, 44b and 44c which heat the gas phase component of the gaseous hydrocarbon fluid and three-way valves 45a, 45b, and 45c which change the flow path of the separated gas phase component as means for removing the condensed condensate oil and regenerating the inorganic separation membrane. If the gas phase components heated by the heaters 44a, 44b and 44c respectively flow into the separation membrane modules 41, 42, and 43 when regenerating the inorganic separation membranes, the temperature inside each of the separation membrane modules 41, 42, and 43 increases and the condensate oil attached to the inorganic separation membrane vaporizes. The vaporized condensate oil is discharged from each of the separation membrane modules 41, 42, and 43 together with the heated gas phase component. Accordingly, the inorganic separation membranes are regenerated. However, the gas phase component containing the vaporized condensate oil does not flow into the separation device 50, is recycled to the upstream side of the compressor 20A while the flow path is switched in the three-way valves 45a, 45b, and 45c, and is pressurized together with the gas phase component from which the oil phase component and the water phase component are separated in the separator 10.

When regenerating the inorganic separation membrane, the inflow amount of the gas phase component into each of the separation membrane modules 41, 42, and 43 per unit time is preferably 1 to 70% and more preferably 10 to 20% of the inflow amount during a normal operation. When the inflow amount of the gas phase component is adjusted as described above, the amount of heat to be supplied to the heaters 44a, 44b and 44c can be reduced.

Additionally, the inorganic separation membrane regenerating process may be performed in all separation membrane modules 41, 42, and 43 by stopping the acidic gas separation device, but may be individually performed by setting a time lag for each of the separation membrane modules 41, 42, and 43 while continuing the operation of the acidic gas separation device.

In consideration of the fact that the acidic gas separation device includes the above-described regeneration means, a ceramic separation membrane that has a high separation ratio of acidic gas and hydrocarbons, is excellent in heat resistance, and is not easily deteriorated by heating for regeneration is preferably employed as the inorganic separation membrane included in each of the separation membrane modules 41, 42, and 43. Particularly, it is more preferable to employ a zeolite separation membrane having a so-called molecular sieving function in which the permeability of carbon dioxide or hydrogen sulfide is set to be larger than that of methane by controlling the crystal structure and adjusting the size of the pores.

The separation device 50 includes separation membrane modules 51, 52, and 53 having organic polymer separation membranes. Each of the separation membrane modules 51, 52, and 53 separates the second gaseous fluid separated from the first gaseous fluid in the separation device 40 into a third gaseous fluid permeating the separation membrane and having a large acidic gas content and a fourth gaseous fluid having a smaller acidic gas content than the third gaseous fluid by the organic polymer separation membrane. The fourth gaseous fluid separated from the third gaseous fluid by the separation device 50 is carried to the shipping base through a pipeline and methane and ethane are shipped as a natural gas after the acidic gas and water are finally removed. Further, pentane and heavy hydrocarbon having a molecular weight equal to or larger than pentane are separated and are shipped as condensate oil. Furthermore, the components containing propane and butane as main components are usually compressed and shipped as a liquefied petroleum gas.

In the present embodiment, the separation device 50 preferably employs a separation membrane module having a hollow fiber membrane structure or a spiral membrane structure which is superior in acidic gas separation ability compared to size and weight. As the organic polymer separation membrane included in the separation device 50, it is preferable to use an existing organic polymer separation membrane of cellulose acetate type, polyimide type, polyamide type, or the like.

In the present embodiment, the separation membrane modules 51, 52, and 53 are disposed in series. This is because the separation membrane usually has better acidic gas permeability than hydrocarbons.

Next, an operation of the acidic gas separation device of the present embodiment will be described. First, an oil field production fluid which is pumped up from the production well W1 is introduced into the separator 10 through a path L1 and is separated into an oil phase component which is rich in oil, a water phase component which contains metals such as iron and mercury and its compounds, and a gas phase component which contains a plurality of hydrocarbons having different boiling points. The oil phase component is carried to the shipping base through a pipeline L2 as a main component of crude oil and is shipped as the crude oil. The water is carried to a purification facility (not shown) through a path L3, is subjected to a purification treatment at the site, and is injected underground or discharged into the environment.

The gas phase component separated from the oil phase component and the water phase component in the separator 10 contains a so-called acidic gas such as carbon dioxide and hydrogen sulfide, water vapor, and the like in addition to methane and ethane which are main components of a natural gas as a product, propane and butane which are main components of a liquefied petroleum gas (LPG), a small amount of pentane, and heavy hydrocarbon having a molecular weight equal to or larger than pentane. The gas phase component is introduced into the compressor 20A through a path L4 and is pressurized to about 10 atm.

The gas phase component pressurized by the compressor 20A, that is, the gaseous hydrocarbon fluid, is introduced into the condenser 30, is cooled to about 5 to 10° C., and is introduced in parallel to the separation membrane modules 41, 42, and 43 in the separation device 40 through a path L5. The condensate oil separated from the gaseous hydrocarbon fluid in the condenser 30 is carried to the shipping base through a pipeline L2 as crude oil together with the oil component separated from water and the gas phase component in the separator 10.

The gas phase component introduced into each of the separation membrane modules 41, 42, and 43 is separated into a first gaseous fluid having a large acidic gas content and a second gaseous fluid having a smaller acidic gas content than the first gaseous fluid while permeating the inorganic separation membrane inside the module. The first gaseous fluid is introduced into an injection well W2 through a path L6 and is enclosed in the aquifer, the depleted oil layer, or the gas layer existing underground. Since the acidic gas component is separated in each of the separation membrane modules 41, 42, and 43, the acidic gas concentration of the second gaseous fluid decreases to be smaller than 20% and preferably 10%. The second gaseous fluid of which the acidic gas concentration decreases is sequentially introduced into the separation membrane modules 51, 52, and 53 inside the separation device 50 through a path L7.

Here, in order to individually regenerate the separation membrane modules 41, 42, and 43 while continuing the operation of the acidic gas separation device, for example, the heater 44a is operated and the three-way valve 45a is switched. When the gas phase component heated by the heater 44a flows into the separation membrane module 41, the temperature inside the separation membrane module 41 increases and the condensate oil attached to the inorganic separation membrane is vaporized. At this time, the temperature inside the separation membrane module 41 is preferably maintained at 90 to 200° C. The vaporized condensate oil is discharged from the separation membrane module 41 together with the heated gas phase component. Accordingly, the inorganic separation membrane is regenerated. The gas phase component containing the vaporized condensate oil is cooled by the cooler 55, is recycled to the compressor 20A through a path L8, and is pressurized by the compressor 20A together with the gas phase component having passed through the separator 10.

When the regeneration of the separation membrane module 41 ends, the separation membrane modules 42 and 43 are sequentially regenerated according to the above-described procedure.

The second gaseous fluid introduced into each of the separation membrane modules 51, 52, and 53 is separated into a third gaseous fluid having a large acidic gas content and a fourth gaseous fluid having a smaller acidic gas content than the third gaseous fluid while permeating the organic polymer separation membrane inside the module. Since the third gaseous fluid contains about 30 to 50% of hydrocarbon components, the third gaseous fluid is pressurized by the compressor 20B and is then recycled to the separation device 40 through a flow path L9. Since the acidic gas is separated in each of the separation membrane modules 51, 52, and 53, the acidic gas concentration of the fourth gaseous fluid decreases to be smaller than 8%. The fourth gaseous fluid is carried to the shipping base through a path L10 and a pipeline and methane and ethane are shipped as a natural gas after the acidic gas and water are finally removed. Further, pentane and heavy hydrocarbon having a molecular weight equal to or larger than pentane are separated and are shipped as condensate oil. Furthermore, the components containing propane and butane as main components are usually compressed and shipped as a liquefied petroleum gas.

According to the acidic gas separation device of the present embodiment, the gaseous hydrocarbon fluid containing the acidic gas is separated in two stages in the separation device 40 and 50 from the gaseous hydrocarbon fluid acquired from the production well W1 and in the separation device 40, the concentration of the acidic gas and condensate oil component in the gaseous hydrocarbon fluid is decreased to the extent that deterioration of the performance of organic polymer separation membranes does not progress easily by using the separation modules 41, 42, and 43 having the ceramic separation membranes which are easily regenerated. Then, in the separation device 50, the acidic gas concentration of the gaseous hydrocarbon fluid is decreased by using the separation modules 51, 52, and 53 having the organic polymer separation membranes. Accordingly, it is possible to reduce the frequency of module replacement by suppressing the deterioration of the performance of the organic polymer separation membrane which is not easily regenerated. That is, the separation modules 51, 52, and 53 which have the advantages of energy efficiency, a compact size not requiring a large installation area, and easy operation can be used for a long period of time without frequent replacement. Thus, it is possible to reduce the driving cost of the acidic gas separation device and to improve the profitability of natural gas production from the gaseous hydrocarbon fluid derived from an oil field (or gas field) in which the concentration of available components has decreased.

Additionally, in the present embodiment, the separation membrane modules 41, 42, and 43 are installed in parallel. However, depending on the performance of the separation membrane and the properties of the gas to be treated, a plurality of series in which a plurality of separation membrane modules are connected in series may be provided and they may be appropriately changed by connecting them in parallel. The number of the separation membrane modules is increased or decreased in response to the amount of the gaseous hydrocarbon fluid to be treated (flow rate per hour). Further, in the present embodiment, the separation membrane modules 51, 52, and 53 are disposed in series. The number of the separation membrane modules is increased or decreased in response to the amount of the gaseous hydrocarbon fluid to be treated (flow rate per hour). Of course, both the separation devices 40 and 50 may have one separation membrane module if the amount of gaseous hydrocarbons to be treated is small.

Second Embodiment

Figure 2:
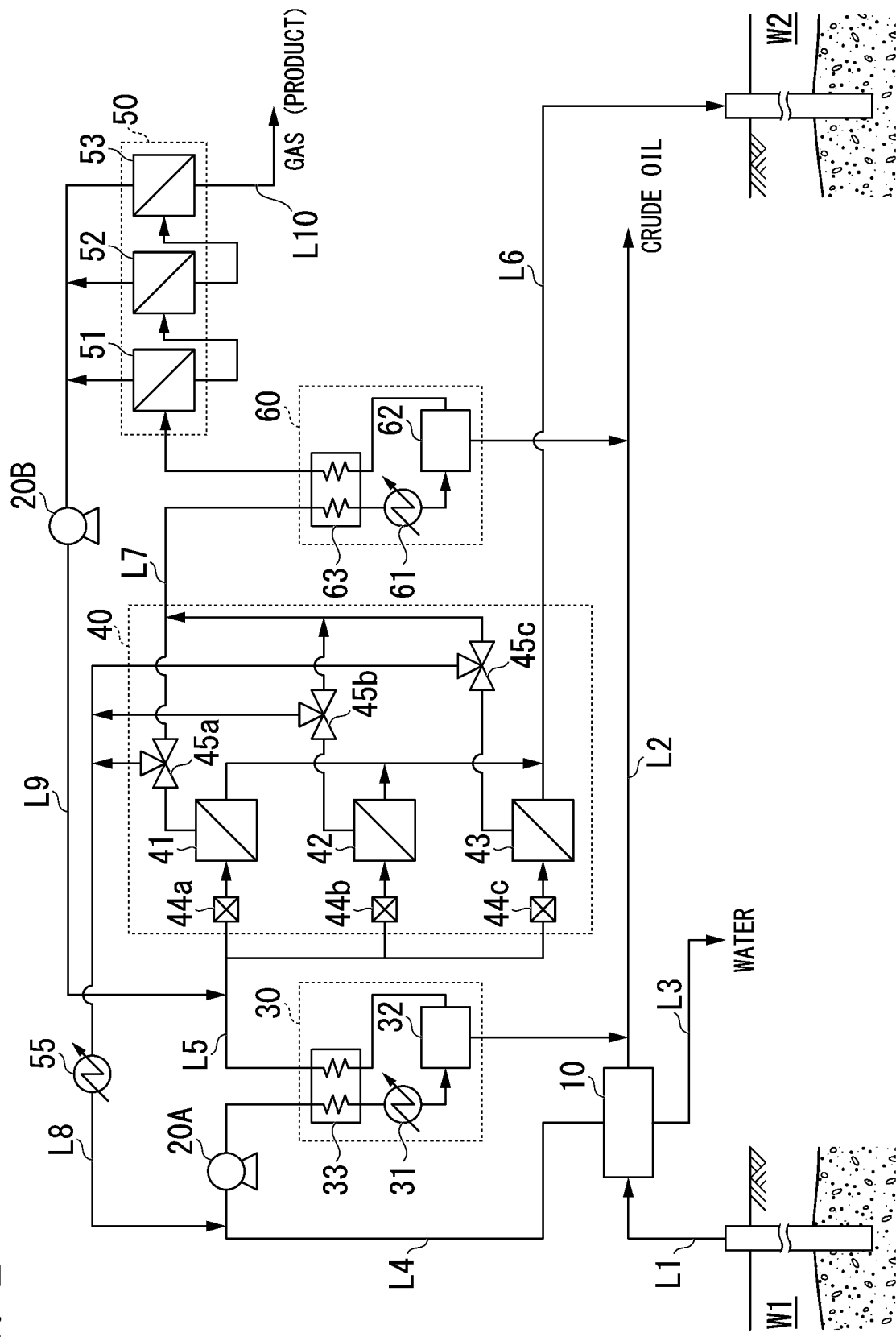
FIG. 2 is a block diagram showing a configuration of a second embodiment of the acidic gas separation device of the present invention.

As shown in FIG. 2, an acidic gas separation device according to the present embodiment includes a condenser (second high-boiling-point component separation device) 60 in addition to the separator 10, the compressors 20A and 20B, the condenser 30, and the separation devices 40 and 50. Hereinafter, each device having the same structure as that of the first embodiment will not be described.

The condenser 60 includes a cooler 61, a gas-liquid separation device 62, and a heat exchanger 63. A second gaseous fluid separated from the first gaseous fluid in the separation device 40 is introduced into the cooler 61 through a path L7. The cooler 61 condenses water vapor contained in the second gaseous fluid and high-boiling-point hydrocarbon components close to the saturated state by cooling the second gaseous fluid. The gas-liquid separation device 62 separates the high-boiling-point hydrocarbon component condensed by the cooler 61 from the second gaseous fluid. The high-boiling-point hydrocarbon component separated from the second gaseous fluid by the gas-liquid separation device 62 is carried to the shipping base through a pipeline together with the oil component separated from the water and the gas phase component in the separator 10. The heat exchanger 63 heats the second gaseous fluid having passed through the gas-liquid separation device 62 by exchanging heat between the second gaseous fluid to be introduced into the cooler 61 in the condenser 60 and the second gaseous fluid from which the high-boiling-point hydrocarbon component is separated in the gas-liquid separation device 62. The second gaseous fluid having passed through the heat exchanger 63 is introduced into the separation device 50 through the path L7.

According to the acidic gas separation device of the present embodiment, a part of the acidic gas is removed in the separation device 40 and a part of the high-boiling-point hydrocarbon component close to saturation in the second gaseous fluid is condensed by the condenser 60 and is removed from the second gaseous fluid. Accordingly, the partial pressure of the high-boiling-point hydrocarbon component in the second gaseous fluid supplied to the separation device 50 is significantly lower than that in the saturated state. Therefore, the acidic gas is removed while the second gaseous fluid passes through the separation membrane modules 51, 52, and 53 disposed in series and the high-boiling-point hydrocarbon component is not easily condensed inside the separation membrane modules 51, 52, and 53 even when the partial pressure of the high-boiling-point hydrocarbon component slightly remaining in the second gaseous fluid gradually increases. Accordingly, it is possible to prevent deterioration of the organic separation membrane in the separation device 50.

Additionally, the high-boiling-point hydrocarbon component separated from the second gaseous fluid in the condenser 60 may be carried to the shipping base through the pipeline while being mixed with the crude oil as described above or may be directly shipped as the LPG or condensate oil.

Third Embodiment

Figure 3:
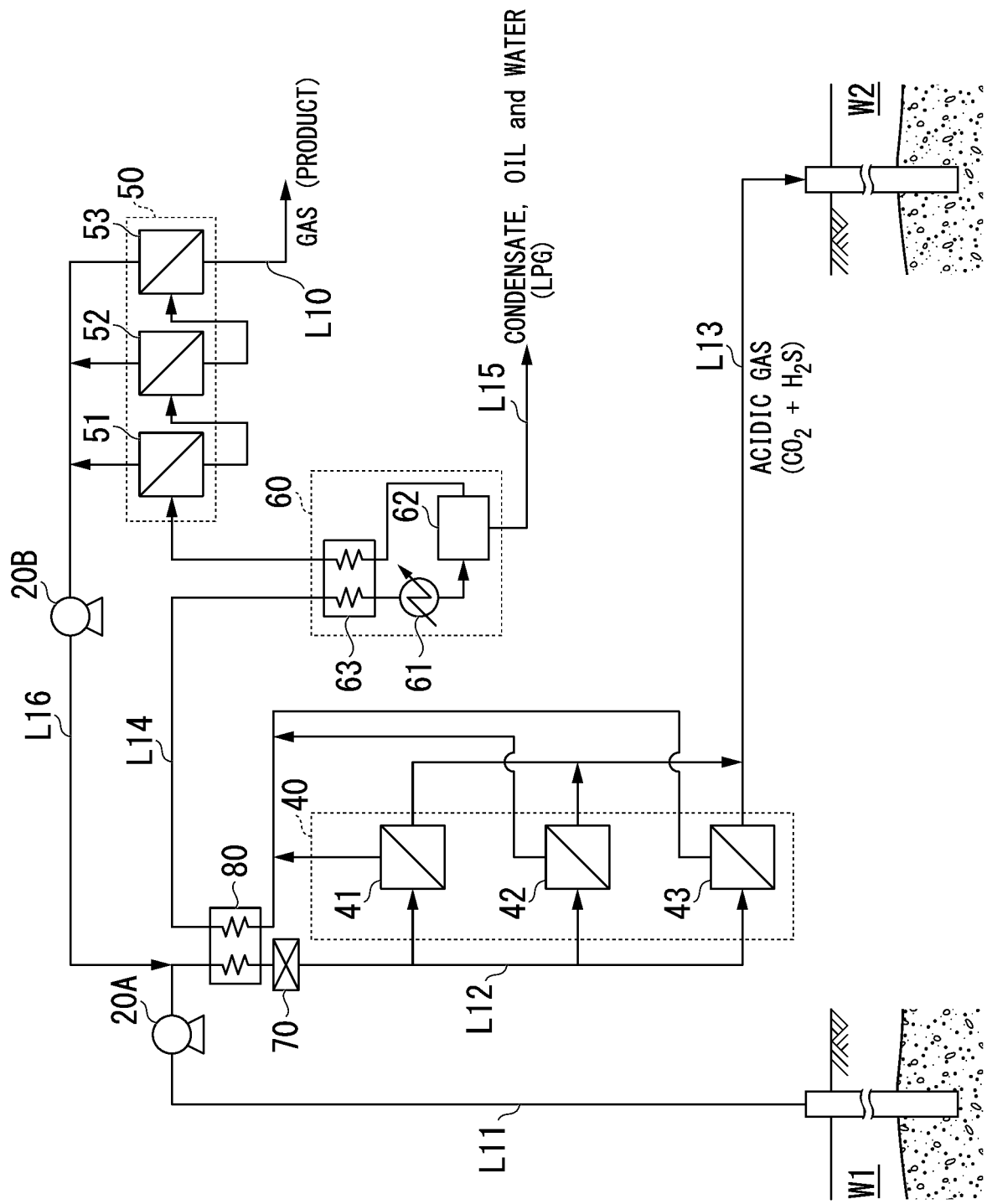
FIG. 3 is a block diagram showing a configuration of a third embodiment of the acidic gas separation device of the present invention.

As shown in FIG. 3, an acidic gas separation device according to the present embodiment includes the compressors 20A and 20B, the separation devices 40 and 50, the condenser 60, a heater 70, and a heat exchanger 80. Hereinafter, each device having the same structure as that of the first embodiment will not be described.

Since the acidic gas separation device of the present embodiment is applied to a gas field production fluid of which an acidic gas concentration is, for example, 30 to 40%, the separator 10 is not provided. Instead of the separator, the heater 70 and the heat exchanger 80 are provided.

The heater 70 heats gaseous hydrocarbon pressurized by the compressor 20A. The heat exchanger 80 heats the gaseous hydrocarbon to be introduced into the separation device 40 by exchanging heat between the gaseous hydrocarbon to be heated by the heater 70 and the second gaseous fluid separated from the first gaseous fluid in the separation device 40.

Next, an operation of the acidic gas separation device of the present embodiment will be described. First, the gas field production fluid acquired from the production well W1 is introduced into the compressor 20A through a path L11 after solids such as sand are removed in a removal facility (not shown) and is pressurized to about 10 atm.

The gas field production fluid pressurized by the compressor 20A, that is, the gaseous hydrocarbon fluid, is heated by exchanging heat with the second gaseous fluid separated from the first gaseous fluid in the separation device 40 in the heat exchanger 80 and is further heated in the heater 70 if necessary. The temperature of the gaseous hydrocarbon heated in the heater 70 and the heat exchanger 80 increases to about 70 to 200° C.

The gaseous hydrocarbon fluid heated in the heater 70 and the heat exchanger 80 is introduced in parallel into the separation membrane modules 41, 42, and 43 inside the separation device 40 through a path L12.

The gaseous hydrocarbon fluid introduced into each of the separation membrane modules 41, 42, and 43 is separated into the first gaseous fluid and the second gaseous fluid. The first gaseous fluid is introduced into the injection well W2 through a path L13 and is enclosed in an aquifer or depleted oil layer existing underground. Since the acidic gas component is separated in each of the separation membrane modules 41, 42, and 43, the acidic gas concentration of the second gaseous fluid decreases to about 20%. The second gaseous fluid of which the acidic gas concentration decreases is introduced into the condenser 60 through a path L14. Additionally, the path L14 is a normal pipe that does not perform heat insulation or the like and the second gaseous fluid is cooled to about room temperature while flowing through the path L14.

The second gaseous fluid introduced into the condenser 60 is cooled by the cooler 61 and the water vapor contained in the second gaseous fluid and the high-boiling-point hydrocarbon component close to the saturated state are condensed. The condensed high-boiling-point hydrocarbon component is separated from the second gaseous fluid by the gas-liquid separation device 62 together with the condensed water and is discharged to the outside of the system through the path L15. Additionally, the high-boiling-point hydrocarbon component discharged through the path 15 is a mixture of water, condensate oil, and a small amount of a petroleum gas and each of the petroleum gas and condensate oil is shipped as a product after water is separated.

The second gaseous fluid separated from the water and the high-boiling-point hydrocarbon component exchanges heat with the second gaseous fluid to be introduced into the cooler 61 in the heat exchanger 63. The temperature of the second gaseous fluid having passed through the heat exchanger 63 decreases until the temperature is returned to about room temperature. The second gaseous fluid having passed through the heat exchanger 63 is sequentially introduced into the separation membrane modules 51, 52, and 53 inside the separation device 50 through the path L14.

The second gaseous fluid introduced into each of the separation membrane modules 51, 52, and 53 is separated into the third gaseous fluid and the fourth gaseous fluid while permeating the organic polymer separation membrane inside the module. The third gaseous fluid is pressurized by the compressor 20B and is recycled to the separation device 40 through a flow path L16. Since the acidic gas is separated in each of the separation membrane modules 51, 52, and 53, the acidic gas concentration of the fourth gaseous fluid decreases to about 10%. The fourth gaseous fluid is carried to an LNG liquefaction base through a path L17 and is shipped as a liquefied natural gas after a residual acidic gas and high-boiling-point hydrocarbons are removed.

According to the acidic gas separation device of the present embodiment, since the temperature of the gaseous hydrocarbon supplied to the separation device 40 is set to be higher than those of the first embodiment and the second embodiment, the condensation of the high-boiling-point components does not occur inside the separator 40 even when the gaseous hydrocarbon fluid contains a high concentration of an acidic gas. Accordingly, there is no need to perform the separation membrane regenerating process in the separation device 40. That is, the acidic gas separation device may not be stopped in order to regenerate the separation membrane. Alternatively, since the regenerating process is performed by individually separating the separation membrane modules 41, 42, and 43 from the system, the treatment efficiency of the acidic gas separation device will not be reduced from the normal operation. Further, since the condenser 30 provided in the first embodiment and the second embodiment can be omitted, it is advantageous in terms of facility cost.

Further, according to the acidic gas separation device of the present embodiment, since the boundary layer (boundary film) of the velocity and density of the fluid in the vicinity of the separation membrane becomes thin and the spatial gradient of the velocity and density in the boundary layer becomes steep under the same pressure as in the first and second embodiments, the permeability is improved. Thus, the separation device 40 can be decreased in size.

As described above, preferred embodiments of the present invention have been described, but the present invention is not limited to the above-described embodiments. The configuration can be added, omitted, replaced, and modified into other configurations without departing from the spirit of the present invention. The present invention is not limited to the description above and is limited only to the matter stated in the claims.

INDUSTRIAL APPLICABILITY

The present invention relates to an acidic gas separation device and an acidic gas separation method. According to the present invention, since the ceramic separation membrane with an excellent separation ratio of acidic gas/hydrocarbon gas is used to separate the acidic gas discharged to the outside of the treatment system, it is possible to reduce the loss of the hydrocarbon component discharged together with the acidic gas, that is, methane loss. Further, since the polymer separation membrane with excellent separation efficiency for the installation area can be used for removing the acidic gas in the rear stage, the initial cost of the acidic gas separation device can be reduced. Furthermore, since the deterioration of the polymer separation membrane is small and the frequency of replacement of the separation membrane can be reduced, the operation rate of the facility is improved. Thus, it is possible to improve the profitability of natural gas production from the gaseous hydrocarbon fluid from an oil field (or gas field) with a reduced concentration of available components.

REFERENCE SIGNS LIST

10 Separator
20A, 20B Compressor (pressurizing device)
30 Condenser (first high-boiling-point component separation device)
40 Separation device (first separation device)
41, 42, and 43 Separation membrane module
50 Separation device (second separation device)
51, 52, and 53 Separation membrane module
60 Condenser (second high-boiling-point component separation device)
W1 Production well
W2 Injection well

The invention claimed is:

1. An acidic gas separation device comprising:
a separator which is configured to separate a gas phase component containing a plurality of hydrocarbons having different boiling points from an oil field production fluid;
a first condenser which is configured to condense heavy hydrocarbons having a molecular weight equal to or larger than pentane included in the gas phase component to separate the heavy hydrocarbons from the gas phase component;
an inorganic separation membrane which is configured to separate the gas phase component from which the heavy hydrocarbons are separated by the first condenser into a first gaseous fluid and a second gaseous fluid of which an acidic gas content is smaller than that of the first gaseous fluid; and
an organic polymer separation membrane which is configured to separate the second gaseous fluid separated from the first gaseous fluid by the inorganic separation membrane into a third gaseous fluid and a fourth gaseous fluid of which an acidic gas content is smaller than that of the third gaseous fluid.

2. The acidic gas separation device according to claim 1, wherein the inorganic separation membrane is a ceramic separation membrane.

3. An acidic gas separation method comprising:
a first separation step of separating a gas phase component containing a plurality of hydrocarbons having different boiling points from an oil field production fluid;
a second separation step of separating heavy hydrocarbons having a molecular weight equal to or larger than pentane from the gas phase component by condensing the heavy hydrocarbons included in the gas phase component;
a third separation step of separating the gas phase component from which the heavy hydrocarbons are separated in the second separation step into a first gaseous fluid and a second gaseous fluid of which an acidic gas content is smaller than that of the first gaseous fluid by an inorganic separation membrane; and
a fourth separation step of separating the second gaseous fluid into a third gaseous fluid and a fourth gaseous fluid of which an acidic gas content is smaller than that of the third gaseous fluid by an organic polymer separation membrane.

4. The acidic gas separation device according to claim 1, further comprising a first compressor which is configured to pressurize the gas phase component separated from the oil field production fluid by the separator,
wherein the first condenser cools the gas phase component pressurized by the first compressor.

5. The acidic gas separation device according to claim 1, further comprising a second condenser which is configured to condense heavy hydrocarbons having a molecular weight equal to or larger than pentane included in the second gaseous fluid separated from the first gaseous fluid by the inorganic separation membrane to separate the heavy hydrocarbons from the gas phase component,
wherein the organic polymer separation membrane separates the second gaseous fluid from which the heavy hydrocarbons are separated by the second condenser into the third gaseous fluid and the fourth gaseous fluid.

6. The acidic gas separation device according to claim 1, further comprising a second compressor configured to which is configured to pressurize the third gaseous fluid, wherein the third gaseous fluid pressurized by the second compressor is fed to the inorganic separation membrane.

7. An acidic gas separation device further comprising:
a heater which is configured to heat a gas field production fluid;
an inorganic separation membrane which is configured to separate the gas field production fluid heated by the heater into a first gaseous fluid and a second gaseous fluid of which an acidic gas content is smaller than that of the first gaseous fluid;
a second condenser which is configured to condense heavy hydrocarbons having a molecular weight equal to or larger than pentane included in the second gaseous fluid to separate the heavy hydrocarbons from the second gaseous fluid; and
an organic polymer separation membrane which is configured to separate the second gaseous fluid from which the heavy hydrocarbons are separated by the second condenser into a third gaseous fluid and a fourth gaseous fluid of which an acidic gas content is smaller than that of the third gaseous fluid.

8. The acidic gas separation device according to claim 7, wherein the inorganic separation membrane is a ceramic separation membrane.

9. The acidic gas separation device according to claim 7, further comprising a heat exchanger configured to exchange for heat between the gas field production fluid before introduced to the heater and the second gaseous fluid separated from the first gaseous fluid by the inorganic separation membrane to heat the gas field production fluid.

10. The acidic gas separation device according to claim 7, further comprising a second compressor configured to which is configured to pressurize the third gaseous fluid, wherein the third gaseous fluid pressurized by the second compressor is fed to the inorganic separation membrane.

11. The acidic gas separation device according to claim 1, further comprising a first compressor which is configured to pressurize the gas field production fluid which is before introduced to the heater, wherein the heater heats the gas field production fluid pressurized by the first compressor.

12. The acidic gas separation method according to claim 3, wherein the acidic gas content of the second gaseous fluid separated from the first gaseous fluid by the inorganic separation membrane is smaller than 20%.

* * * * *